(12) United States Patent
Yan et al.

(10) Patent No.: US 11,131,397 B2
(45) Date of Patent: Sep. 28, 2021

(54) ELECTRIC BALL VALVE AND MANUFACTURING METHOD THEREFOR

(71) Applicant: Zhejiang Sanhua Climate and Appliance Controls Group Co., Ltd, Shaoxing (CN)

(72) Inventors: Weilin Yan, Zhejiang (CN); Minghui Xu, Zhejiang (CN)

(73) Assignee: Zhejiang Sanhua Climate and Appliance Controls Group Co., Ltd, Shaoxing (CN)

( * ) Notice: Subject to any disclaimer, the term of this patent is extended or adjusted under 35 U.S.C. 154(b) by 0 days.

(21) Appl. No.: 17/040,932

(22) PCT Filed: Jun. 21, 2019

(86) PCT No.: PCT/CN2019/092297
§ 371 (c)(1),
(2) Date: Sep. 23, 2020

(87) PCT Pub. No.: WO2020/015497
PCT Pub. Date: Jan. 23, 2020

(65) Prior Publication Data
US 2021/0025506 A1 Jan. 28, 2021

(30) Foreign Application Priority Data

Jul. 17, 2018 (CN) .......................... 201810781935.6

(51) Int. Cl.
*F16K 5/06* (2006.01)
*B21K 1/20* (2006.01)
*F16K 31/04* (2006.01)

(52) U.S. Cl.
CPC .............. *F16K 5/0647* (2013.01); *B21K 1/20* (2013.01); *F16K 31/047* (2013.01)

(58) Field of Classification Search
CPC .......................... F16K 5/0647; F16K 31/047
See application file for complete search history.

(56) References Cited

U.S. PATENT DOCUMENTS 4,858,827 A * 8/1989 Fletcher ................ A01G 25/16
239/69

FOREIGN PATENT DOCUMENTS

CN     201170368 Y    12/2008
CN     201475407 U     5/2010
(Continued)

OTHER PUBLICATIONS

International Search Report and Written Opinion for International Application No. PCT/CN2019/092297, dated Aug. 29, 2019.
(Continued)

*Primary Examiner* — Eric Keasel
(74) *Attorney, Agent, or Firm* — Wolf, Greenfield & Sacks, P.C.

(57) ABSTRACT

An electric ball valve and a manufacturing method therefor. The electric ball valve comprises a control component, a gear decelerating mechanism, a valve body component, and a housing component, wherein the control component comprises a cover and a rotator component provided in the cover, the housing component comprises an upper housing part and a lower housing part, the cover, the upper housing part and the lower housing part are made out of a stainless steel material by machining, the cover is fixed to the upper housing part by welding, the upper housing part is fixed to the lower housing part by welding, and the lower housing part is fixed to a valve body by welding.

20 Claims, 9 Drawing Sheets

(56) References Cited

FOREIGN PATENT DOCUMENTS

| | | |
|---|---|---|
| CN | 103672008 A | 3/2014 |
| CN | 203979607 U | 12/2014 |
| CN | 205937930 U | 2/2017 |
| CN | 206093065 U | 4/2017 |
| CN | 207049360 U | 2/2018 |
| EP | 0 272 991 A1 | 6/1988 |
| JP | 2006-009830 A | 1/2006 |

OTHER PUBLICATIONS

Chinese Office Action dated Feb. 5, 2021 in connection with Chinese Application No. 201810781935.6, and English translation thereof.

* cited by examiner

ELECTRIC BALL VALVE AND MANUFACTURING METHOD THEREFOR

This application is a national stage filing under 35 U.S.C. § 371 of International Patent Application Serial No. PCT/CN2019/092297, filed Jun. 21, 2019, which claims priority to Chinese Patent Application No. 201810781935.6, titled "ELECTRIC BALL VALVE AND MANUFACTURING METHOD THEREFOR", filed with the China National Intellectual Property Administration on Jul. 17, 2018. The contents of these applications are incorporated herein by reference in their entirety.

FIELD

The present application relates to the technical field of fluid control, and in particular to an electric ball valve and manufacturing method therefor.

BACKGROUND

FIG. 17 is a schematic sectional view of an electric valve in the background art. As shown in FIG. 17, the electric valve includes a motor 01 and a valve body 02. A valve core 04 is arranged in the inner cavity of the valve body 02, the upper end of a valve stem 03 is rotatably connected with the motor 01, and the lower end of the valve stem 03 is rotatably connected with the valve core 04. In this structure, part of the valve stem 03 is exposed outside, and the external leakage of fluid is mainly prevented by the sealing ring 05 sleeved on the outer periphery of the valve stem 03. However, after the frequent operation of the electric valve, the durability of the sealing ring 05 is decreased, which affects the sealing effect and may result in external leakage of fluid. When the fluid is a compound such as refrigerant, the external leakage of fluid will cause environmental pollution.

In view of this, how to reduce the risk of external leakage of the electric valve is a technical problem to be solved urgently by those skilled in the art.

SUMMARY

An object of the present application is to provide an electric ball valve, which includes a control component, a gear reduction mechanism, a valve body component and a housing component. The control component includes a cover body and a rotor component arranged in the cover body. The gear reduction mechanism is arranged in an inner cavity of the housing component, and the gear reduction mechanism includes an input gear component and an output gear carrier. A rotating shaft of the rotor component can drive the input gear component to rotate in a circumferential direction. The valve body component includes a valve body, a valve stem, a first valve seat, and a valve core. The first valve seat is fixedly connected with the valve body, and the valve core is arranged in an inner cavity of the valve body component. One end of the valve stem extends into a central hole of the output gear carrier, and the output gear carrier can drive the valve stem to rotate in the circumferential direction. Another end of the valve stem extends into a groove of the valve core, and the valve stem can drive the valve core to rotate in the circumferential direction. The housing component includes an upper housing portion and a lower housing portion. The cover body, the upper housing portion and the lower housing portion are made of stainless steel material. The cover body is fixed to the upper housing portion by welding, the upper housing portion is fixed to the lower housing portion by welding, and the lower housing portion is fixed to the valve body by welding.

A method for manufacturing the electric ball valve is further provided according to the present application, which includes the following steps:

Step A10: preparing the valve body, the first valve seat and a first connecting pipe, and stretching and lathing the stainless steel material to prepare the cover body, the upper housing portion and the lower housing portion;

Step A20: fixing the lower housing portion to the valve body by welding, fixing the first valve seat to the first connecting pipe by welding, and fixedly connecting the valve body with the first valve seat by screw or welding;

Step A30: fixing the cover body to the upper housing portion by welding;

Step A40: fixing the upper housing portion to the lower housing portion by welding.

According to the electric ball valve and the manufacturing method therefor provided by the present application, the cover body, the upper housing portion, and the lower housing portion are made of stainless steel material, the cover body is fixed to the upper housing portion by welding, the upper housing portion is fixed to the lower housing portion by welding, and the lower housing portion is fixed to the valve body by welding. Compared with the background art, the risk of external leakage of the electric valve can be reduced.

Figure 1:
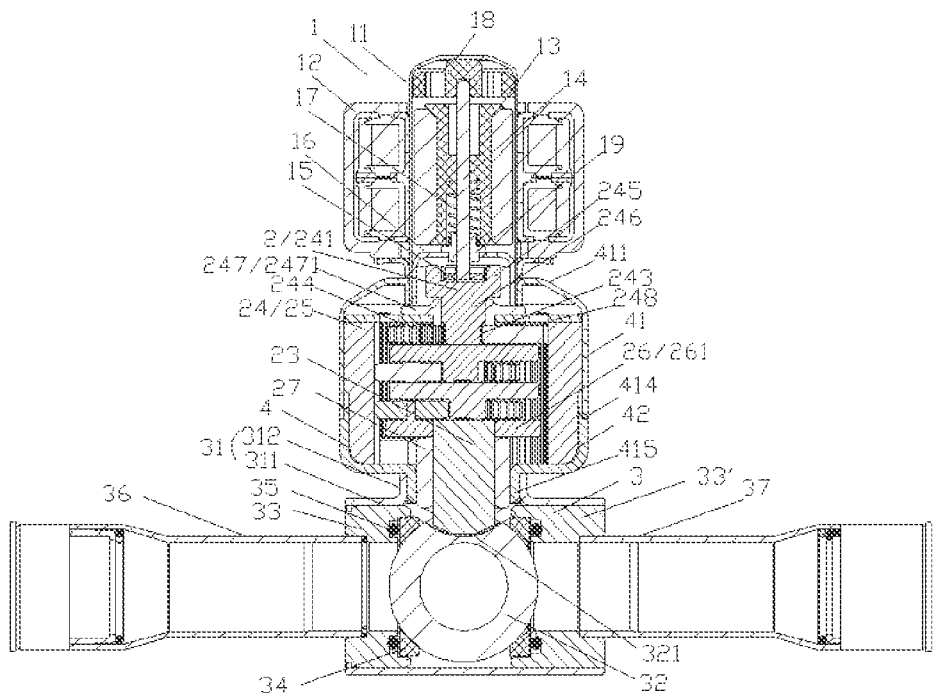
FIG. 1 is a schematic sectional view of an electric ball valve provided by the present application.

Reference numerals in FIGS. 1 to 16:

| | |
|---|---|
| 1 control component; | 11 cover body, |
| 12 coil; | 13 rotor component, |
| 131 bracket, | 132 magnet, |
| 14 rotating shaft, | 141 shaft body; |
| 15 transmission plate, | 151 base portion, |
| 152 plate portion, | 1521 side wall portion; |
| 16 support frame, | 17 spring, |
| 18 bearing seat, | 19 third bearing member; |
| 2 gear reduction mechanism; | 23 valve stem, |
| 231 first key portion, | 232 second key portion, |
| 233 arc-shaped end portion; | 24 planetary gear mechanism, |
| 241 input gear component; | 242 groove, |
| 2421 groove wall portion; | 243 input gear, |
| 244 planetary gear; | 245 large-diameter portion, |
| 246 small-diameter portion; | 247 first bearing member, |
| 2471 flange portion; | 248 cover plate, |
| 2481 through hole; | 25 gear ring, |
| 251 position-limiting groove; | 26 output gear carrier, |
| 261 disc-shaped body portion; | 262 central through hole, |
| 263/263' protrusion, | 264 boss; |
| 27 second bearing member, | 271 tubular portion, |
| 272 extension portion; | 3 valve body component, |
| 30 inner cavity of valve body component, | 31/31A valve body; |
| 310/310A rotation clearance, | 311/311A body portion, |
| 312/312A projection portion; | 3120A via hole, |
| 32 valve core, | 321 groove; |
| 33/33A first valve seat; | 33' second valve seat, |
| 34 sealing gasket; | 35 O-ring, |
| 36 first connecting pipe, | 37 second connecting pipe; |
| 4 housing component, | 40 inner cavity of housing component, |
| 41 upper housing portion, | 42 lower housing portion; |
| 411 bent portion, | 412 tapered portion, |
| 413 inward bent portion; | 414 stepped portion, |
| 415 reduced-diameter portion, | 416 transition portion. |

DETAILED DESCRIPTION OF THE EMBODIMENTS

A core of the present application is to provide an electric ball valve and a manufacturing method therefor. A cover body, an upper housing portion, and a lower housing portion are made of stainless steel material. The cover body is fixed to the upper housing portion by welding, the upper housing portion is fixed to the lower housing portion by welding, and the lower housing portion is fixed to the valve body by welding. Compared with the background art, the risk of external leakage of the electric valve can be reduced.

In order to provide those skilled in the art with a better understanding of the solutions of the present application, the present application will be described hereinafter in further detail in conjunction with the drawings and specific embodiments.

It should be noted that, the orientation terms, such as upper and lower, involved in this application are defined with reference to the positions of the components in the figures and the relative positions of the components as shown in FIGS. 1 to 16, which are only for clarity and ease of describing the technical solutions. It will be appreciated that, those orientation terms used herein do not limit the protection scope of the present application.

Figure 2:
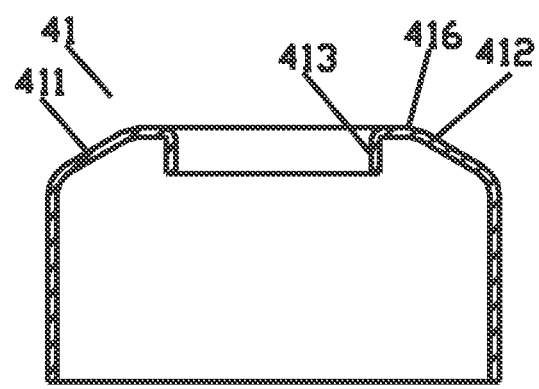
FIG. 2 is a schematic structural view of an upper housing portion in FIG. 1.
Figure 3:
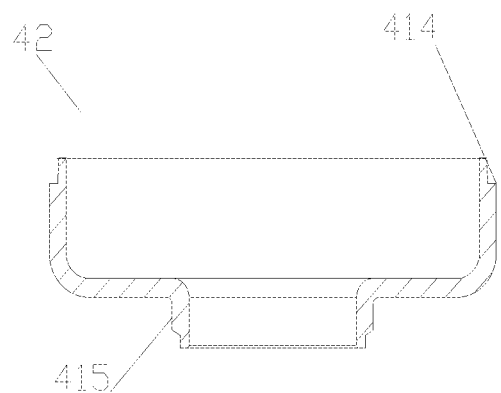
FIG. 3 is a schematic structural view of a lower housing portion in FIG. 1.
Figure 4:
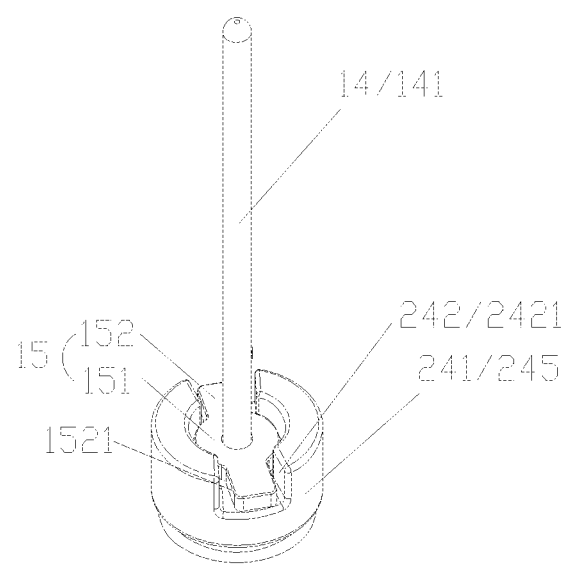
FIG. 4 is a schematic view of the cooperation between a rotating shaft and an input gear component in FIG. 1.
Figure 5:
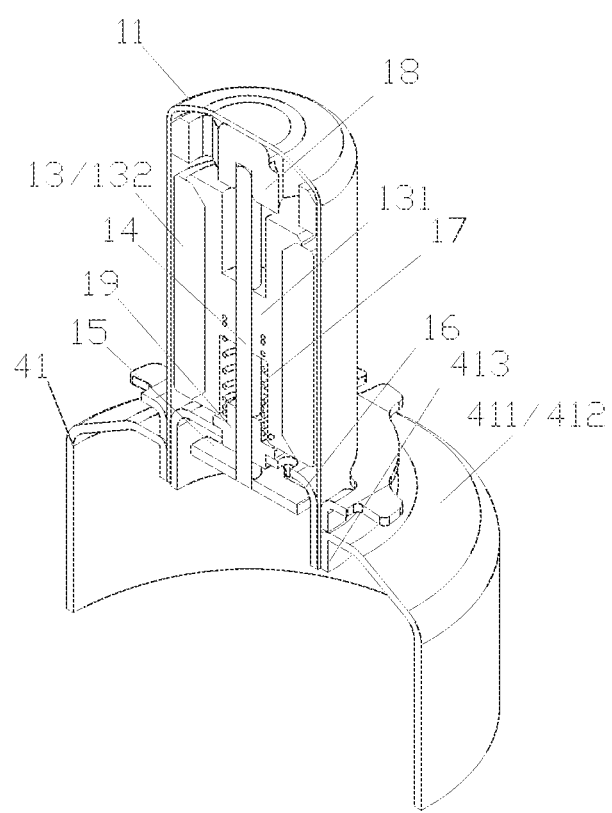
FIG. 5 is a half-sectional view of the assembly of a control component and the upper housing portion in FIG. 1.
Figure 6:
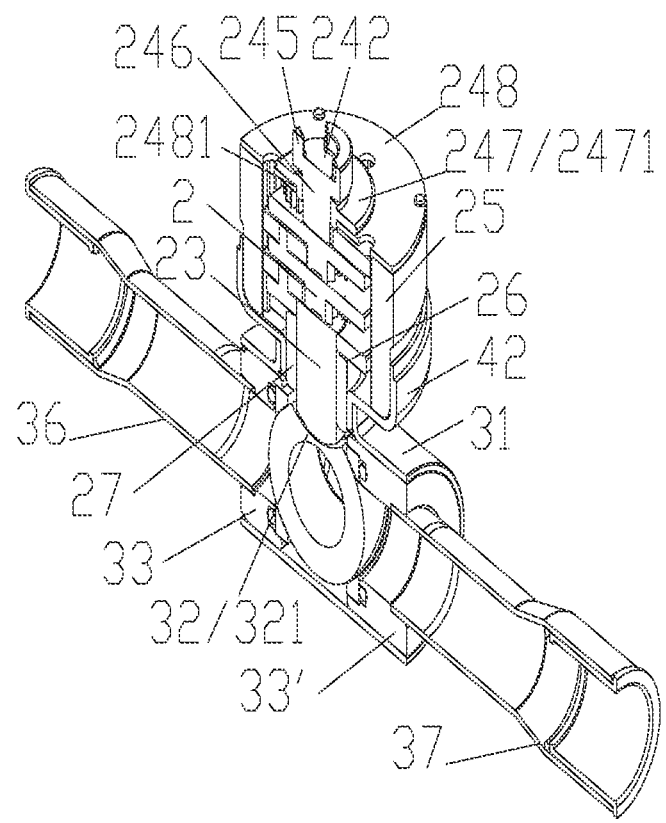
FIG. 6 is a half-sectional view of the assembly of a gear reduction mechanism, a valve body component and the lower housing portion in FIG. 1.
Figure 7:
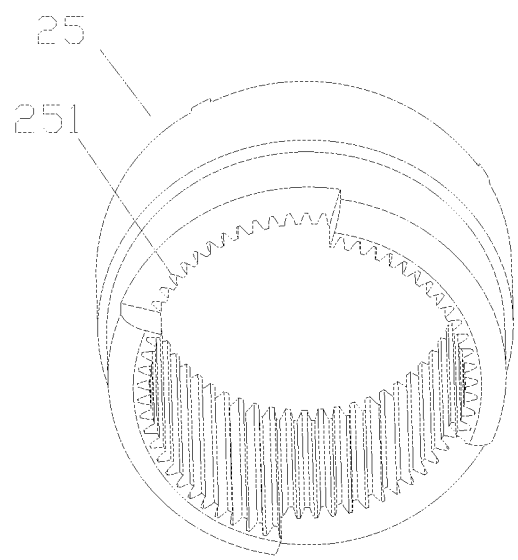
FIG. 7 is a schematic structural view of a gear ring in FIG. 1.
Figure 8:
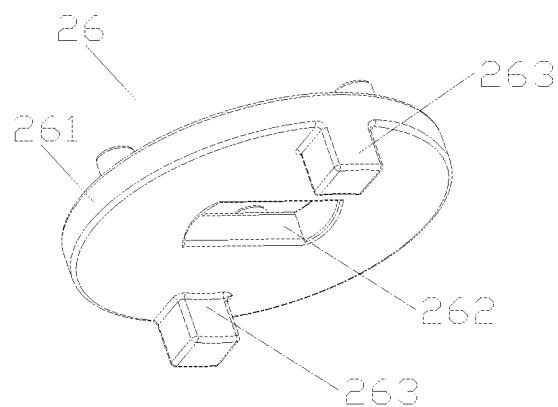
FIG. 8 is a schematic structural view of an output gear carrier in FIG. 1.
Figure 9:
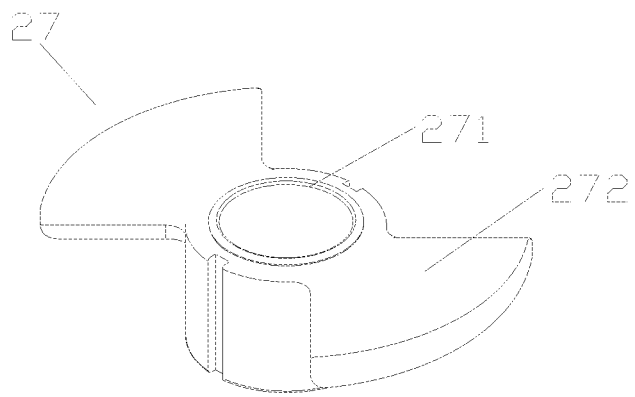
FIG. 9 is a schematic structural view of a second bearing member in FIG. 1.
Figure 10:
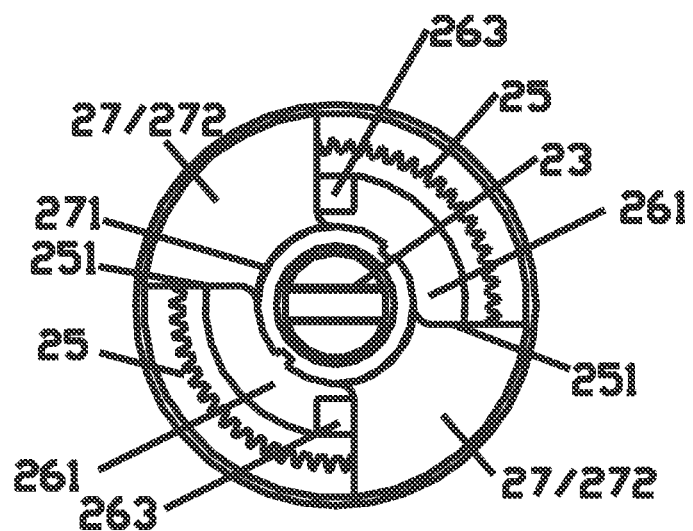
FIG. 10 is a schematic view of the cooperation of the gear ring, the output gear carrier and the second bearing member in FIG. 1.
Figure 11:
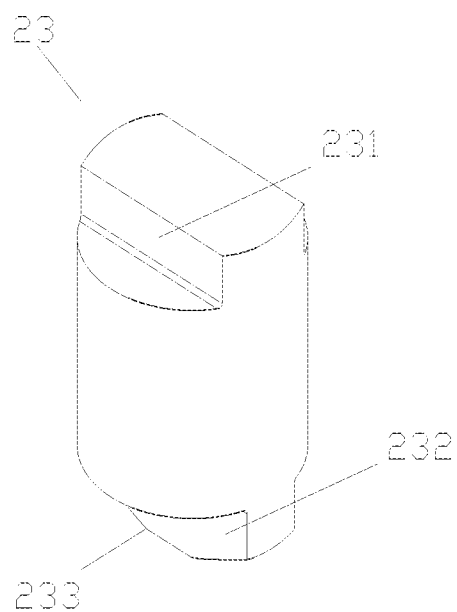
FIG. 11 is a schematic structural view of a valve stem in FIG. 1.
Figure 12:
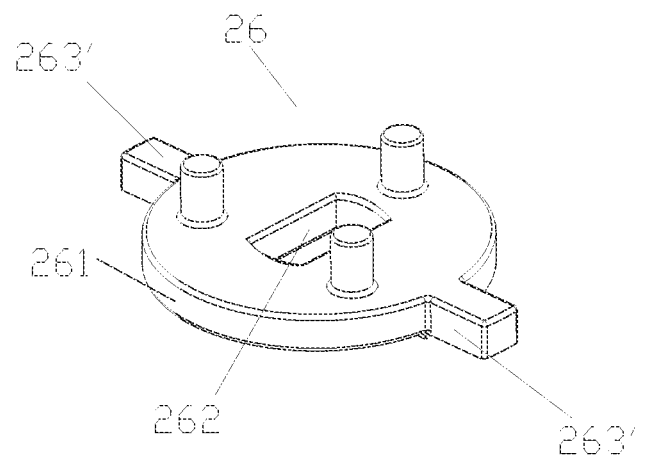
FIG. 12 is a schematic structural view of another output gear carrier according to the present application.
Figure 13:
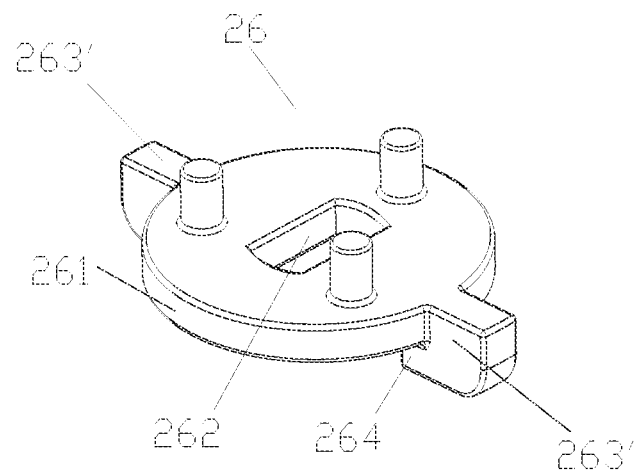
FIG. 13 is a schematic structural view of a third output gear carrier according to the present application.
Figure 14:
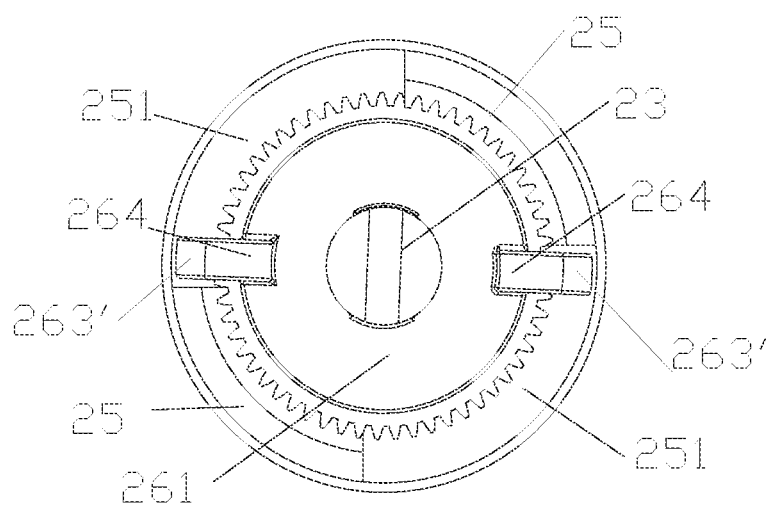
FIG. 14 is a schematic view of the cooperation of the output gear carrier and the gear ring shown in FIG. 13.

FIG. 1 is a schematic sectional view of an electric ball valve provided by the present application; FIG. 2 is a schematic structural view of an upper housing portion in FIG. 1; FIG. 3 is a schematic structural view of a lower housing portion in FIG. 1; FIG. 4 is a schematic view of the cooperation between a rotating shaft and an input gear component in FIG. 1; FIG. 5 is a half-sectional view of the assembly of a control component and the upper housing portion in FIG. 1; FIG. 6 is a half-sectional view of the assembly of a gear reduction mechanism, a valve body component and the lower housing portion in FIG. 1; FIG. 7 is a schematic structural view of a gear ring in FIG. 1; FIG. 8 is a schematic structural view of an output gear carrier in FIG. 1; FIG. 9 is a schematic structural view of a second bearing member in FIG. 1; FIG. 10 is a schematic view of the cooperation of the gear ring, the output gear carrier and the second bearing member in FIG. 1; FIG. 11 is a schematic structural view of a valve stem in FIG. 1; FIG. 12 is a schematic structural view of another output gear carrier according to the present application; FIG. 13 is a schematic structural view of a third output gear carrier according to the present application; FIG. 14 is a schematic view of the cooperation of the output gear carrier and the gear ring shown in FIG. 13.

As shown in FIG. 1, the electric ball valve includes a control component 1, a gear reduction mechanism 2, a valve body component 3 and a housing component 4. The valve cavity of the electric ball valve includes an inner cavity 30 of the valve body component and an inner cavity 40 of the housing component.

The control component 1 includes a cover body 11, a coil 12 and a rotor component 13. The cover body 11 is in a tubular shape with a bottom and is made of stainless steel material, specifically made by stretching stainless steel sheet. The coil 12 is sleeved on the outer periphery of the cover body 11. The rotor component 13 includes a rotating shaft 14, a plastic bracket 131, and a magnet 132 provided on the outer periphery of the bracket 131. The magnet 132 is made by sintering magnetic powder. The rod-shaped shaft body 141 of the rotating shaft 14 is made by processing stainless steel bars. The shaft body 141 and the magnet 132 are put into a mold cavity, and then the bracket 131 is injection-molded in the mold cavity to fix the shaft body 141 and the magnet 132. A bearing seat 18 is fixedly arranged at an upper part of the inside of the cover body 11. The bearing seat 18 is provided with a central blind hole, and an upper end of the rotating shaft 14 is inserted into the central blind hole for positioning. The coil 12 is energized and is configured to drive the rotating shaft 14 to rotate in a circumferential direction.

The gear reduction mechanism 2 is provided in the inner cavity 40 of the housing component. The gear reduction mechanism 2 includes an input gear component 241 and an output gear carrier 26. The rotating shaft 14 is flexibly connected with the input gear component 241. The flexible connection here refers to that there is a certain movement clearance between the rotating shaft 14 and the input gear component 241 connected to each other, and the rotating shaft 14 can drive the input gear component 241 to rotate in the circumferential direction.

The valve body component 3 includes a valve body 31, a valve stem 23, a first valve seat 33, a second valve seat 33' and a valve core 32. The valve body 31 is substantially tubular. The first valve seat 33 is fixed to one end of the valve body 31 by welding, and the second valve seat 33' is fixed to another end of the valve body 31 by welding. The valve core 32 is substantially spherical, and is arranged in the inner cavity 30 of the valve body component, and is located between the first valve seat 33 and the second valve seat 33'. The valve body 31 includes a body portion 311 and a projection portion 312 extending outward from the peripheral outer edge of the body portion 311. The projection portion 312 is substantially tubular. The valve stem 23 penetrates through the projection portion 312, and an upper end of the valve stem 23 extends into the gear reduction mechanism 2 and is in keyway connection with a central through hole 262 of the output gear carrier 26. The output gear carrier 26 is configured to drive the valve stem 23 to rotate in the circumferential direction. A lower end of the valve stem 23 extends into the body portion 311 and is in keyway connection with a groove 321 of the valve core 32. The valve stem 23 is configured to drive the valve core 32 to rotate in the circumferential direction.

The housing component 4 includes an upper housing portion 41 and a lower housing portion 42. The cover body 11, the upper housing portion 41 and the lower housing portion 42 are made by first stretching and then lathing stainless steel sheet. The body portion 311 and the projection portion 312 of the valve body 31 are made of stainless steel pipes. Apparently, the stainless steel pipe may be prepared by first curling and then welding the stainless steel sheet, and then the welded stainless steel pipe is processed into the valve body 31. The body portion 311 of the valve body 31 is formed by cutting a stainless steel pipe, and the projection portion 312 is formed on the basis of the body portion 311 by first stamping and then flanging. The upper housing portion 41 is fixed to the cover body 11 by welding. The lower housing portion 42 includes a reduced-diameter portion 415 which is fixed by welding with the projection portion 312 of the valve body 31.

In this embodiment, the cover body, the upper housing portion, and the lower housing portion are made of stainless steel material, the cover body is fixed to the upper housing portion by welding, the upper housing portion is fixed to the lower housing portion by welding, the lower housing portion is fixed to the valve body by welding, the gear reduction mechanism is provided in the inner cavity of the housing component, the valve core is provided in the inner cavity of the valve body component, one end of the valve stem cooperates with the central hole of the output gear carrier of the gear reduction mechanism, and the other end thereof cooperates with the valve core. The beneficial effect of this solution is that the risk of external leakage of the electric valve can be reduced.

Further, as shown in FIG. 2, the upper end of the upper housing portion 41 is bent inward to form a bent portion 411, which includes a tapered portion 412, an inward bent portion 413 and a transition portion 416 connecting the tapered portion 412 with the inward bent portion 413. The inward bent portion 413 extends downward from one end of the transition portion 416 along an axial direction of the electric ball valve, and the inward bent portion 413 is attached and welded to the outer edge of the lower end of the cover body 11. With this arrangement, the upper end of the upper housing portion 41 bulges outward, and its beneficial effect is that the strength of the upper housing portion 41 is increased, and the upper housing portion 41 will not be easily damaged even if it is subjected to a strong impact from the refrigerant.

Further, as shown in FIG. 3, the wall thickness of the lower housing portion 42 is greater than that of the upper housing portion 41. A stepped portion 414 with a stepped surface facing upwards is provided at the upper end of the lower housing portion 42, and the upper housing portion 41 is placed at the stepped portion 414 and fixed thereto by welding. By providing the stepped portion, the beneficial effect is that it is easy to locate the upper housing portion and the lower housing portion when welding, and the welding quality is guaranteed.

As shown in FIG. 4, the rotating shaft 14 includes a rod-shaped shaft body 141 and a transmission plate 15 fixedly arranged at the lower end of the shaft body 141. The transmission plate 15 includes a base portion 151 and a plate portion 152 extending radially outward from the base portion 151. The base portion 151 is fixed to the shaft body 141 by interference fit or welding, and the plate portion 152 includes a side wall portion 1521. A groove 242 is provided at the upper end of the input gear component 241, and an input gear 243 is provided at the lower end thereof. The input gear 243 meshes with a planetary gear 244 of the gear reduction mechanism 2. At least part of the plate portion 152 extends into the groove 242, and the groove 242 includes a groove wall portion 2421 which can abut against the side wall portion 1521. A preset circumferential movement space is provided between the groove wall portion 2421 and the side wall portion 1521. When the rotating shaft 14 rotates, the side wall portion 1521 of the plate portion 152 abuts against the groove wall portion 2421 of the groove 242, thereby driving the input gear component 241 to rotate in the circumferential direction. By providing the circumferential movement clearance between the plate portion 152 of the transmission plate 15 and the groove 242 to flexibly connect them, the processing accuracy of the transmission plate 15 and the groove 242 and the control accuracy of assembling can be reduced, thereby reducing the manufacturing cost and improving the qualification rate of assembly.

Further, as shown in FIG. 1 and FIG. 6, in this embodiment, the gear reduction mechanism 2 is a planetary gear mechanism 24. The input gear component 241 includes a large-diameter portion 245 and a small-diameter portion 246. The groove 242 is provided at the upper end of the large-diameter portion 245, and the input gear 243 is provided at the lower end of the small-diameter portion 246. A first bearing member 247 is sleeved on the outer edge of the small-diameter portion 246. The first bearing member 247 is provided with a flange portion 2471, and the first bearing member 247 is made of wear-resistant material. The upper end surface of the first bearing member 247 contacts the lower end surface of the large-diameter portion 245, the lower end surface of the flange portion 2471 contacts a cover plate 248 of the planetary gear mechanism 24, and the lower end of the first bearing member 247 passes through a through hole 2481 of the cover plate 248. By sleeving the first bearing member 247 on the outer periphery of the small-diameter portion 246 of the input gear component 241, on the one hand, the input gear component 241 can be supported, and on the other hand, the wear of the input gear component 241 during circumferential rotation can be reduced, thus prolonging the service life of the input gear component.

Further, as shown in FIG. 5, the control component 1 further includes a support frame 16, a spring 17 and a third bearing member 19. The third bearing member 19 is made by wear-resistant material powder metallurgy, and is sleeved on the shaft body 141 and placed on the support frame 16. The support frame 16 is substantially in the shape of an inverted cup, and the support frame 16 is placed on the flange portion 2471 or the cover plate 248. The spring 17 is sleeved on the shaft body 141. One end of the spring abuts against the third bearing member 19, and the other end abuts against the bracket 131 of the rotor component 13. Apparently, the third bearing member 19 may be dispensed with, and one end of the spring 17 directly abuts against the support frame 16. In this embodiment, the rotor component 13 is supported in the cover body 11 by the elastic force of the spring 17. Since the contact area between the spring 17 and the third bearing member 19 and the bracket 131 is small and the third bearing member 19 is made of wear-resistant material, this arrangement can reduce the wear of the spring 17, prolong its service life and reduce the energy consumption of the coil 12.

Figure 15:
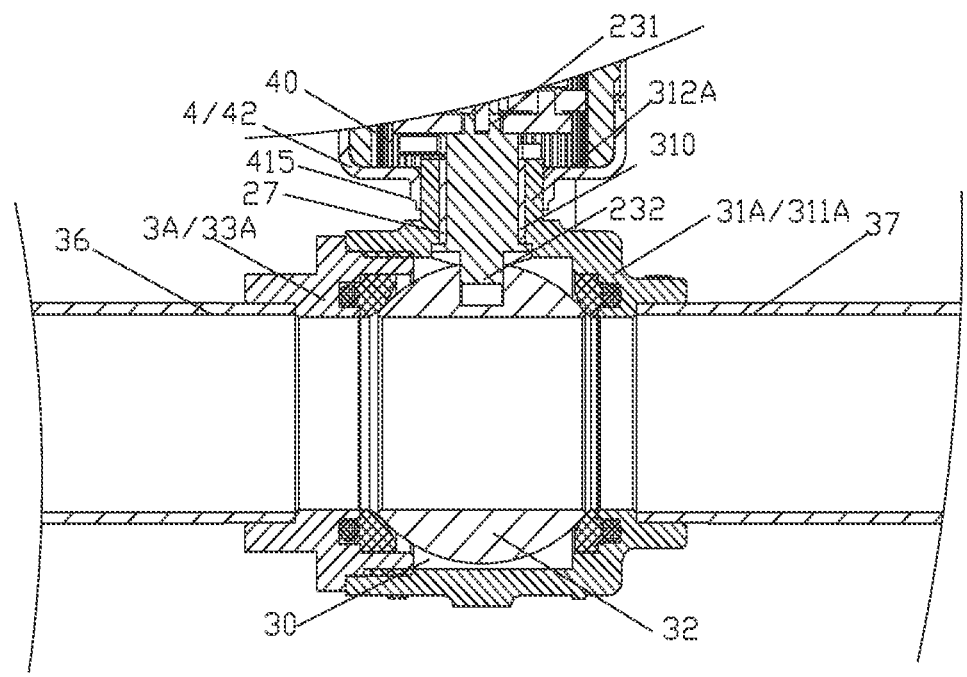
FIG. 15 is a schematic partial sectional view of another electric ball valve provided by the present application.

As shown in FIG. 1, the inner wall of the projection portion 312 of the valve body 31 is fixed to the outer wall of the reduced-diameter portion 415 of the lower housing portion 42 by welding, and a second bearing member 27 is provided between the reduced-diameter portion 415 and the valve stem 23. Apparently, as shown in FIG. 15, it is also applicable that, the outer wall of the projection portion 312A is fixed to the inner wall of the reduced-diameter portion 415 by welding, and the second bearing member 27 is provided between the protruding portion 312A and the valve stem 23. The second bearing member 27 is made by wear-resistant material powder metallurgy. The beneficial effect of this arrangement lies in that the wear of the valve stem 23 during the circumferential rotation is reduced and the service life of the valve stem is prolonged.

With reference to FIG. 1, FIG. 6, FIG. 11 and FIG. 15, since the valve stem 23 can rotate circumferentially with respect to the second bearing member 27 and a rotation clearance 310 is provided between the second bearing member 27 and the valve stem 23, the inner cavity 40 of the housing component is in communication with the inner cavity 30 of the valve body component through the rotation clearance 310. One end of the valve stem 23 facing the control component 1 includes a first key portion 231 which is in keyway connection with the central through hole 262 of the output gear carrier 26, and the first key portion 231 is located in the inner cavity 40 of the housing component. The first key portion 231 has a non-circular cross section and is in keyway fit with the output gear carrier 26. The other end of the valve stem 23 includes a second key portion 232 which is in keyway connection with the valve core 32, and the second key portion 232 is located in the inner cavity 30 of the valve body component. An arc-shaped end portion 233 is provided at the lower end of the second key portion 232, the bottom of the groove 321 of the valve core 32 is arc-shaped, the arc-shaped end portion 233 extends into the groove 321, and the second key portion 232 is in keyway fit with the valve core 32. With this arrangement, the inner cavity 40 of the housing component is in communication with the inner cavity 30 of the valve body component only through the rotation clearance 310. The beneficial effect of this arrangement is that the risk of external leakage of the electric valve can be reduced.

Apparently, it is conceivable that, in order to increase the fluid communication performance between the inner cavity 40 of the housing component and the inner cavity 30 of the valve body component, an axial through groove may be provided on the peripheral outer edge of the second bearing member 27 to introduce more fluid into the inner cavity 40 of the housing component, which can enhance the internal circulation of the valve cavity of the electric valve, cool the gear reduction mechanism and prolong its service life.

As shown in FIGS. 7 to 10, in this embodiment, the planetary gear mechanism 24 further includes a gear ring 25, and a position-limiting groove is provided at the lower end of the gear ring 25. The output gear carrier 26 includes a disc-shaped body portion 261. A central through hole 262 is provided in the disc-shaped body portion 261, and the cross section of the central through hole 262 is non-circular. A protrusion 263 is provided on one side of the disc-shaped body portion 261 facing the valve core 32. In this embodiment, the second bearing member 27 includes a tubular portion 271 and an extension portion 272 extending radially outward from the outer edge of the tubular portion 271. The outer end edge of the extension portion 272 is fixed to the inner wall of the lower housing portion 42 by welding. One end of the extension portion 272 away from the tubular portion 271 is in keyway fit with the position-limiting groove 251, and the other end of the extension portion 272 is in cooperation with the protrusion 263 to limit the circumferential rotation stroke of the output gear carrier 26.

In the above embodiment, since the extension portion of the second bearing member is fixed to the lower housing portion by welding, on the one hand, the gear ring is circumferentially limited due to the keyway fit between the extension portion and the position-limiting groove of the gear ring, and on the other hand, the protrusion is limited by the extension portion, thus limiting the circumferential rotation stroke of the output gear carrier, that is, limiting the circumferential rotation stroke of the valve stem. This arrangement can limit the fully open position and the fully closed position of the valve core, and realize the fully open, fully close and flow regulating functions of the electric ball valve.

Further, two protrusions 263 are provided, and they are arranged symmetrically with respect to the central axis of the central through hole 262. Such arrangement is beneficial to smooth rotation and reliable positioning of the output gear carrier in the circumferential direction. In addition, the protrusions 263 and the disc-shaped body portion 261 are integrally formed by plastic injection molding or metal powder metallurgy, which enhances the strength of the output gear carrier and makes the limit more reliable.

FIG. 12 is another stop structure of the electric ball valve. Different from the above embodiments, in this embodiment, the lower end of the gear ring 25 (excluding the position-limiting groove 251) is fixed to the lower housing portion 42 by welding, and a protrusion 263' is provided on the periphery of the disc-shaped body portion 261, and the position-limiting groove 251 cooperates with the protrusion 263' to limit the circumferential rotation stroke of the output gear carrier 26. With this arrangement, the circumferential rotation stroke of the output gear carrier is limited by the position-limiting groove of the gear ring, which can also limit the fully open and fully closed positions of the valve core, thus realizing the fully open, fully closed and flow regulating functions of the electric ball valve. In this embodiment, there is no need to specially process the second bearing member, the processing procedures are simplified, and the assembly is simple.

Further, a boss 264 is provided on one side of the disc-shaped body portion 261 facing the ball valve core 32. The boss 264 is connected with the protrusion 263' as a whole. The protrusion 263', the boss 264 and the disc-shaped body portion 261 are integrally formed by plastic injection molding or metal powder metallurgy, which enhances the strength of the output gear carrier and makes the limit more reliable.

In conjunction with the above specific embodiments, a method for manufacturing an electric ball valve with a typical structure is described as follows.

Step A10:
preparing a control component 1 including a cover body 11, a coil 12, a rotor component 13, a support frame 16, a spring 17, and a bearing seat 18, wherein a rotating shaft 14 includes a shaft body 141 and a transmission plate 15, and a bracket 131, a magnet 132 and the shaft body 141 are fixedly connected by injection molding to form the rotor component 13 as a whole;

preparing a gear reduction mechanism 2 including a planetary gear mechanism 24, a first bearing member 247, and a second bearing member 27, wherein the planetary gear mechanism 24, the first bearing member 247 and the second bearing member 27 are made by iron-based powder metallurgy;

preparing a valve body component 3 including a valve body 31, a valve stem 23, a valve core 32, a first valve seat 33, a second valve seat 33', a sealing gasket 34, an O-ring 35, a first connecting pipe 36, a second connecting pipe 37, wherein the valve body 31 is made of stainless steel pipe, or the stainless steel pipe is prepared by first curling and then welding stainless steel sheet, and then the welded stainless steel pipe is processed into the valve body 31, wherein the protruding portion 312 of the valve body 31 is made of stainless steel pipe by first stamping and then flanging, the valve stem 23 is made of stainless steel bar material by milling processing of a milling machine, and the first valve seat 33 and the second valve seat 33' are made of stainless steel by lathing; and preparing the housing component 4 including an upper housing portion 41, a lower housing portion 42, wherein the upper housing portion 41 and the lower housing portion 42 are manufactured by first stretching and then lathing stainless steel sheet.

As an embodiment, one end of a stainless steel sheet can be inwardly stretched and bent to form the upper housing portion 41, and the upper end of the upper housing portion is bent to form a tapered portion 412, a transition portion 416 and an inward bent portion 413. By a metal cutting method, a step is lathed on the outer edge of the upper end of the lower housing portion 42 to form a stepped portion 414 for placing the upper housing portion 41.

Step A20:
brazing the lower housing portion 42, the valve body 31, the first valve seat 33 and the first connecting pipe 36 into a whole in a furnace; sequentially mounting one O-ring 35, one sealing gasket 34, the valve core 32, another sealing gasket 34, another O-ring 35 and the second valve seat 33' into the valve body 31; extending the valve stem 23 into the valve body from the reduced-diameter portion 415 of the lower housing portion 42, and inserting the second key portion 232 at the lower end of the valve stem 23 into the groove 321 of the valve core 32, allowing the valve stem 23 to drive the valve core 32 to rotate in a circumferential direction; and then, fixedly connecting the valve body 31, the second valve seat 33' and the second connecting pipe 37 into a whole by argon arc welding or laser welding. Multiple parts are fixed by welding at a time, the process is simple and the product reliability is strong.

Step A30:
sleeving the tubular portion 271 of the second bearing member 27 on the valve stem 23, and then fixedly connecting the outer edge of the extension portion 272 of the second bearing member 27 with the inner wall of the lower housing portion 42 into a whole by laser welding; and mounting the gear reduction mechanism 2 into the lower housing portion 42, and inserting the first key portion 231 at the upper end of the valve stem 23 into the central through hole 262 of the output gear carrier 26, allowing the output gear carrier 26 to drive the valve stem 23 to rotate in the circumferential direction. Hereto, the first assembly is thus formed.

Step A40:
fixedly connecting the cover body 11 with the upper housing portion 41 by brazing in a furnace.

Step A50:
mounting the bearing seat 18, the rotor component 13, the spring 17 and the support frame 16 into the cover body 11, and then fixedly connecting the transmission plate 15 with the lower end of the shaft body 141 by laser welding to form a second assembly.

Step A60:
assembling the first assembly with the second assembly, wherein the transmission plate 15 of the rotating shaft 14 is inserted into the groove 242 of the input gear component 241 of the gear reduction mechanism 2; and the upper housing portion 41 is placed on the stepped portion 414 of the lower housing portion 42, and then the upper housing portion 41 is fixedly connected with the lower housing portion 42 into a whole by laser welding, and then the coil 12 is sleeved on the cover body 11 to form the electric valve.

It should be understood by those skilled in the art that, based on the technical idea of the present application, a variety of assembly sequences and assembly variations can be extended on the basis of the above technical solutions. For example, the performing sequence of step A20 and step A30 may be reversed, and the performing sequence of step A40 and step A50 may be reversed, without affecting the technical effect of the present application.

According to the method for manufacturing the electric ball valve in this embodiment, multiple parts are fixed by welding at a time, the process is simple, the product reliability is strong, and the risk of external leakage of the electric valve can be reduced. Due to the fixed connection by furnace brazing, argon arc welding and laser welding, the production process is clean and environmentally friendly.

Figure 16:
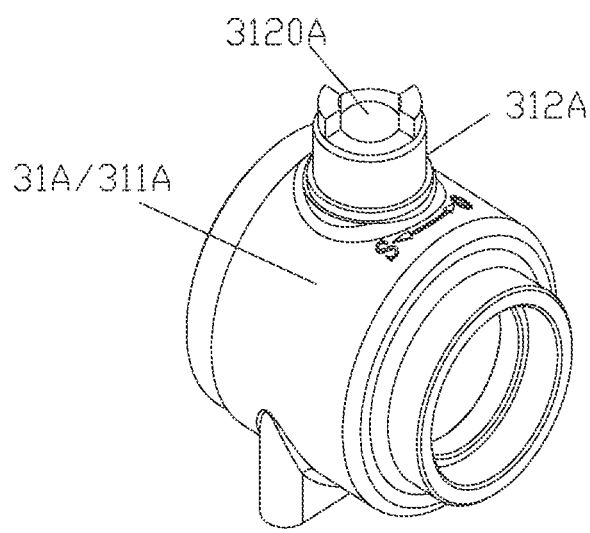
FIG. 16 is a schematic structural view of the valve body in FIG. 15.
Figure 17:
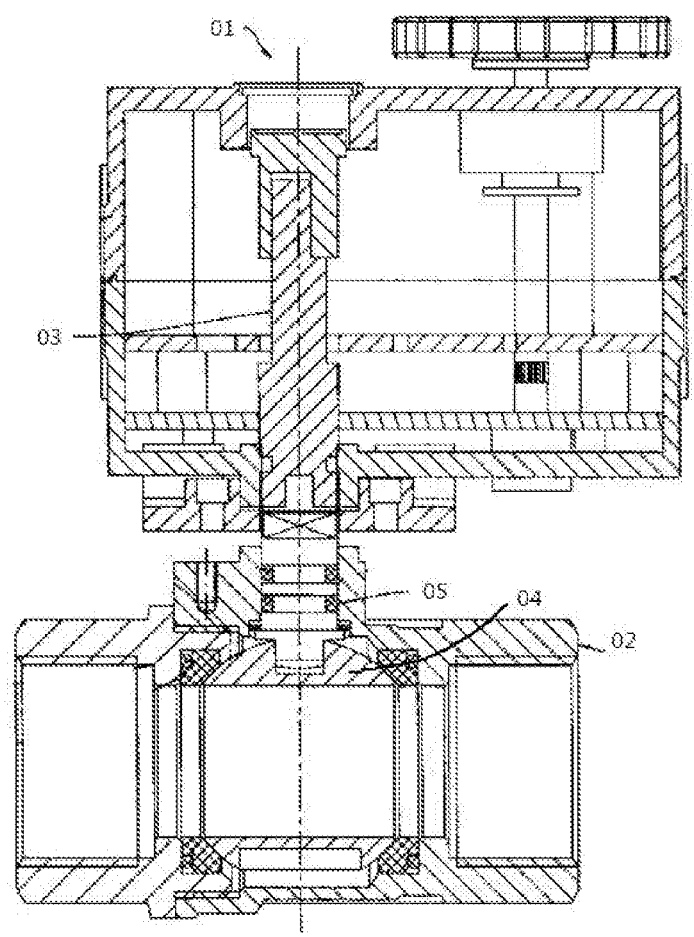
FIG. 17 is a schematic sectional view of an electric ball valve in the background art.

FIG. 15 is a schematic partial sectional view of another electric ball valve provided by the present application. FIG. 16 is a schematic structural view of the valve body in FIG. 15. The difference between this embodiment and the above-mentioned embodiments lies in the structure of the valve body component and the manufacturing method therefor.

As shown in FIGS. 15 and 16, in this embodiment, the valve body component 3A includes a valve body 31A, a valve stem 23, a first valve seat 33A, and a valve core 32. The valve body 31A is made of metal material by forging or casting, and the first valve seat 33A is made of metal material by lathing, forging or casting. The valve body 31A is fixedly connected with the first valve seat 33A to form an inner cavity 30 of the valve body component. The valve body 31A includes a substantially tubular body portion 311A and a protruding portion 312A extending from the outer edge of the body portion 311A toward the control component 1. The protruding portion 312A is provided with an axial via hole 3120A, and the valve stem 23 penetrates through the via hole 3120A.

The method of this embodiment for manufacturing the electric ball valve is different from the above embodiments in that: Step A10: preparing the valve body component 3A, wherein the valve body 31A is made of metal material by forging or casting, and the first valve seat 33A is made of metal material by lathing, forging or casting.

Step A20: fixedly connecting the lower housing portion 42, the valve body 31A, and the second connecting pipe 37 by brazing in a furnace, wherein the reduced-diameter portion 415 of the lower housing portion 42 is fixed to the protruding portion 312A of the valve body 31A by welding; fixedly connecting the first valve seat 33A and the first connecting pipe 36 by brazing in a furnace; and then fixedly connecting the valve body 31A and the first valve seat 33A by screwing, or fixedly connecting the valve body 31A and the first valve seat 33A by argon arc welding or brazing, or fixedly connecting the valve body 31A and the first valve seat 33A by first screwing and then welding.

Step A30: sleeving the second bearing member 27 on the valve stem 23, and then fixedly connecting the outer edge of the second bearing member 27 with the inner wall of the protruding portion 312A into a whole by argon arc welding or brazing.

This embodiment has the same technical effect as the above embodiments, and will not be repeated here.

The principle and the embodiments of the present application are illustrated herein by specific examples. The above description of examples is only intended to facilitate the understanding of the method and spirit of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. An electric ball valve, comprising a control component, a gear reduction mechanism, a valve body component and a housing component, wherein
the control component comprises a cover body and a rotor component arranged in the cover body;
the gear reduction mechanism is arranged in an inner cavity of the housing component, the gear reduction mechanism comprises an input gear component and an output gear carrier, and a rotating shaft of the rotor component is configured to drive the input gear component to rotate in a circumferential direction;
the valve body component comprises a valve body, a valve stem, a first valve seat, and a valve core;
the first valve seat is fixedly connected with the valve body, and the valve core is arranged in an inner cavity of the valve body component;
one end of the valve stem extends into a central hole of the output gear carrier, and the output gear carrier is configured to drive the valve stem to rotate in the circumferential direction; another end of the valve stem extends into a groove of the valve core, and the valve stem is configured to drive the valve core to rotate in the circumferential direction; and
the housing component comprises an upper housing portion and a lower housing portion,
the cover body, the upper housing portion and the lower housing portion are made of stainless steel material,
the cover body is fixed to the upper housing portion by welding, the upper housing portion is fixed to the lower housing portion by welding, and the lower housing portion is fixed to the valve body by welding.

2. The electric ball valve according to claim 1, wherein the gear reduction mechanism is a planetary gear mechanism,
the planetary gear mechanism comprises a gear ring, and a position-limiting groove is provided at a lower end of the gear ring,
the lower end of the gear ring is fixedly connected with the lower housing portion;
the output gear carrier comprises a disc-shaped body portion, a central through hole is provided in the disc-shaped body portion, a cross section of the central through hole is non-circular,
a protrusion is provided on the periphery of the disc-shaped body portion, and the protrusion is configured to abut the position-limiting groove to limit a circumferential rotation stroke of the output gear carrier.

3. The electric ball valve according to claim 1, wherein the valve body is made of metal material by forging or casting, and comprises a body portion and a projection portion extending towards the control component, wherein the projection portion comprises a via hole, and the valve stem penetrates through the via hole.

4. The electric ball valve according to claim 1, wherein an upper end of the upper housing portion comprises an inward bent portion, and the inward bent portion comprises a tapered portion, a transition portion and an inward bent portion,
the transition portion is connected with the tapered portion and the inward bent portion, and the inward bent portion extends downwards from one end of the transition portion along an axial direction of the electric ball valve, and the inward bent portion is fixed to the cover body by welding.

5. The electric ball valve according to claim 1, wherein a wall thickness of the lower housing portion is greater than the wall thickness of the upper housing portion, a stepped portion with a stepped surface facing upwards is provided at an upper end of the lower housing portion, and the upper housing portion is placed at the stepped portion and fixed to the stepped portion by welding.

6. The electric ball valve according to claim 1, wherein the rotating shaft comprises a shaft body and a transmission plate fixedly connected with a lower end of the shaft body,
the transmission plate comprises a base portion fixedly connected with the lower end of the shaft body and a plate portion extending outwards from the base portion,
the plate portion comprises a side wall portion, a groove is provided at an upper end of the input gear component, and an input gear is provided at a lower end of the input gear component, and at least part of the plate portion extends into the groove,
the groove comprises a groove wall portion capable of abutting against the side wall portion, and a circumferential movement clearance is provided between the groove wall portion and the side wall portion.

7. The electric ball valve according to claim 6, wherein the gear reduction mechanism is a planetary gear mechanism and the input gear component comprises a large-diameter portion and a small-diameter portion,
   the groove is provided at an upper end of the large-diameter portion, and the input gear is provided at a lower end of the small-diameter portion,
   a first bearing member is sleeved on the outer periphery of the small-diameter portion, and the first bearing member is provided with a flange portion,
   an upper end surface of the first bearing member contacts a lower end surface of the large-diameter portion, a lower end surface of the flange portion contacts a cover plate of the planetary gear mechanism, and a lower end of the first bearing member passes through a through hole of the cover plate.

8. The electric ball valve according to claim 1, wherein the rotating shaft comprises a shaft body and a transmission plate fixedly connected with a lower end of the shaft body,
   the input gear component comprises a large-diameter portion and a small-diameter portion,
   a first bearing member is sleeved on the outer periphery of the small-diameter portion, and the first bearing member is provided with a flange portion,
   an upper end surface of the first bearing member contacts a lower end surface of the large-diameter portion, a lower end surface of the flange portion contacts a cover plate of the planetary gear mechanism,
   the control component further comprises a support frame and a spring, wherein the support frame is substantially in a shape of an inverted cup, the support frame is placed on the flange portion or the cover plate,
   the spring is sleeved on the shaft body, one end of the spring directly or indirectly abuts the support frame, and another end of the spring abuts against a bracket of the rotor component.

9. The electric ball valve according to claim 1, wherein the valve body is substantially tubular and is made of stainless steel material by stretching,
   the valve body comprises a body portion and a projection portion extending from the periphery of the body portion, wherein the projection portion is substantially tubular, and the valve stem penetrates through the projection portion.

10. The electric ball valve according to claim 9, wherein the lower housing portion comprises a reduced-diameter portion, and the reduced-diameter portion is fixed to the projection portion by welding,
    the inner wall of the projection portion is fixed to the outer wall of the reduced-diameter portion by welding, and a second bearing member is provided between the reduced-diameter portion and the valve stem; or the outer wall of the projection portion is fixed to the inner wall of the reduced-diameter portion by welding, and a second bearing member is provided between the projection portion and the valve stem.

11. The electric ball valve according to claim 10, wherein the gear reduction mechanism is a planetary gear mechanism,
    the planetary gear mechanism further comprises a gear ring, a lower end of the gear ring is provided with a position-limiting groove,
    the output gear carrier comprises a disc-shaped body portion, a central through hole is provided in the disc-shaped body portion, a cross section of the central through hole is non-circular,
    a protrusion is provided on one side of the disc-shaped body portion facing the valve core, the second bearing member comprises a tubular portion and an extension portion extending radially from the tubular portion,
    the extension portion is fixed to the lower housing portion by welding, one end of the extension portion away from the tubular portion is in keyway connection with the position-limiting groove, and
    the protrusion is configured to abut against the extension portion to limit a circumferential rotation stroke of the output gear carrier.

12. The electric ball valve according to claim 11, wherein two protrusions are provided and are arranged symmetrically with respect to the central axis of the central through hole,
    the protrusion and the disc-shaped body portion are integrally formed.

13. The electric ball valve according to claim 10, wherein a rotation clearance is provided between the second bearing member and the valve stem, and the valve cavity of the electric valve comprises the inner cavity of the housing component and the inner cavity of the valve body component,
    the inner cavity of the housing component is in communication with the inner cavity of the valve body component through the rotation clearance,
    one end of the valve stem comprises a first key portion, and the first key portion is positioned in the inner cavity of the housing component,
    another end of the valve stem comprises a second key portion, and the second key portion is positioned in the inner cavity of the valve body component.

14. A method for manufacturing the electric ball valve according to claim 1, comprising the following steps:
    Step A10: preparing the valve body, the first valve seat and the first connecting pipe, and stretching and lathing stainless steel material to prepare the cover body, the upper housing portion and the lower housing portion;
    Step A20: fixing the lower housing portion to the valve body by welding, fixing the first valve seat to the first connecting pipe by welding, and fixedly connecting the valve body with the first valve seat by screw or welding;
    Step A30: fixing the cover body to the upper housing portion by welding; and
    Step A40: fixing the upper housing portion to the lower housing portion by welding.

15. The method according to claim 14 for manufacturing the electric ball valve, wherein
    step A10 further comprises:
    inwardly bending the upper end of the upper housing portion to form a tapered portion, a transition portion and an inward bent portion; and
    processing a stepped portion that cooperates with the upper housing portion at the upper end of the lower housing portion by a metal cutting method.

16. The method according to claim 14 for manufacturing the electric ball valve, wherein the valve body is made of stainless steel material by stretching, and the projection portion of the valve body is made of stainless steel material by stamping and flanging,
    step A10 further comprises:
    preparing a second valve seat and a second connecting pipe, and fixedly connecting the valve body, the second valve seat and the second connecting pipe by welding;
    step A20 further comprises:

fixedly connecting the reduced-diameter portion of the lower housing portion with the projection portion of the valve body by welding.

17. The method according to claim 16 for manufacturing the electric ball valve, wherein step A20 further comprises:

fixedly connecting the lower housing portion, the valve body, the first valve seat and the first connecting pipe by brazing in a furnace, and fixedly connecting the valve body, the second valve seat and the second connecting pipe by argon arc welding or laser welding;

step A30 further comprises:

fixedly connecting the cover body and the upper housing portion by furnace welding;

step A40 further comprises:

fixedly connecting the upper housing portion and the lower housing portion by laser welding.

18. The method according to claim 14 for manufacturing the electric ball valve, wherein the valve body is made of metal material by forging or casting, step A10 further comprises:

preparing a second connecting pipe, and fixedly connecting the valve body and the second connecting pipe by welding;

step A20 further comprises:

fixedly connecting the reduced-diameter portion of the lower housing portion with the projection portion of the valve body by welding.

19. The method according to claim 18 for manufacturing the electric ball valve, wherein step A20 further comprises:

fixedly connecting the lower housing portion, the valve body, and the second connecting pipe by brazing in a furnace, fixedly connecting the first valve seat and the first connecting pipe by brazing in a furnace; fixedly connecting the valve body and the second connecting pipe by argon arc welding or brazing; fixedly connecting the valve body with the first valve seat by screwing or fixedly connecting the valve body with the first valve seat by argon arc welding or brazing;

step A30 further comprises:

fixedly connecting the cover body with the upper housing portion by brazing in a furnace;

step A40 further comprises:

fixedly connecting the upper housing portion with the lower housing portion by laser welding.

20. The method according to claim 14 for manufacturing the electric ball valve, wherein the perform sequence of step A20 and step A30 is able to be reversed.

* * * * *